(12) United States Patent
Sekanina et al.

(10) Patent No.: US 10,549,442 B2
(45) Date of Patent: Feb. 4, 2020

(54) SELF-GUIDING CUTTING DEVICE

(71) Applicant: 3M INNOVATIVE PROPERTIES COMPANY, St. Paul, MN (US)

(72) Inventors: Martin Sekanina, Karlik (CZ); Lukas Marsoun, Zdar nad Sazavou (CZ); Rudolf Melezinek, Prague (CZ); Petr Ludvik, Prague (CZ)

(73) Assignee: 3M Innovative Properties Company, St. Paul, MN (US)

( * ) Notice: Subject to any disclaimer, the term of this patent is extended or adjusted under 35 U.S.C. 154(b) by 569 days.

(21) Appl. No.: 15/115,034

(22) PCT Filed: Jan. 29, 2015

(86) PCT No.: PCT/US2015/013397
§ 371 (c)(1),
(2) Date: Jul. 28, 2016

(87) PCT Pub. No.: WO2015/116746
PCT Pub. Date: Aug. 6, 2015

(65) Prior Publication Data
US 2016/0346947 A1    Dec. 1, 2016

(30) Foreign Application Priority Data
Feb. 3, 2014   (EP) ..................................... 14153724

(51) Int. Cl.
*B26D 7/00* (2006.01)
*B26B 29/00* (2006.01)
(Continued)

(52) U.S. Cl.
CPC ............ *B26D 7/0006* (2013.01); *B26B 29/06* (2013.01); *B26B 25/007* (2013.01); *B26D 3/12* (2013.01);
(Continued)

(58) Field of Classification Search
None
See application file for complete search history.

(56) References Cited

U.S. PATENT DOCUMENTS

| | | |
|---|---|---|
| 1,776,046 A | 9/1930 | Schmidt |
| 5,997,670 A | 12/1999 | Walter |

(Continued)

FOREIGN PATENT DOCUMENTS

| | | |
|---|---|---|
| DE | 19606395 | 10/1997 |
| JP | 09226007 | 9/1997 |

(Continued)

OTHER PUBLICATIONS

International Search Report for PCT International Application No. PCT/US2015/013397, dated Mar. 30, 2015, 3 pages.

*Primary Examiner* — Linda L Gray
(74) *Attorney, Agent, or Firm* — Philip P. Soo

(57) ABSTRACT

Self-guiding cutting tool (100) for cutting an adhesive film (20) applied to the roof panel (30) of a car, wherein the roof panel is connected to a side panel (31) of the car by a joint area (32) containing a welding ditch channel, said cutting tool (100) comprising a cutting device (6), at least one guiding means (2) guiding the cutting device (6) over the welding ditch channel of the joint area (32), and at least one transporting means (3) allowing the cutting device (6) to be moved over the welding ditch channel of the joint area (32). Also provided is a method of applying adhesive films to the roof panels of a car using the cutting tool.

19 Claims, 3 Drawing Sheets

(51) Int. Cl.
  *B29C 63/00* (2006.01)
  *B26B 25/00* (2006.01)
  *B26D 3/00* (2006.01)
  *B26B 29/06* (2006.01)
  *B29C 63/22* (2006.01)
  *B26D 3/12* (2006.01)

(52) U.S. Cl.
  CPC .......... *B29C 63/0082* (2013.01); *B29C 63/22* (2013.01); *Y10T 156/108* (2015.01); *Y10T 156/1026* (2015.01); *Y10T 156/1028* (2015.01); *Y10T 156/1348* (2015.01); *Y10T 156/1365* (2015.01); *Y10T 156/1744* (2015.01); *Y10T 156/1788* (2015.01); *Y10T 156/18* (2015.01)

(56) References Cited

U.S. PATENT DOCUMENTS

| | | | |
|---|---|---|---|
| 6,001,198 A | * | 12/1999 | Habisreitinger .... B29C 63/0056 156/212 |
| 7,686,910 B2 | * | 3/2010 | Habisreitinger ........ B29C 63/02 156/229 |
| 8,495,818 B1 | | 7/2013 | Peppett |
| 2006/0201000 A1 | | 9/2006 | McCallum |
| 2007/0284046 A1 | * | 12/2007 | Habisreitinger ........ B65B 33/04 156/352 |

FOREIGN PATENT DOCUMENTS

WO  WO 2008/014546  2/2008
WO  WO 2015/127350  8/2015

* cited by examiner

SELF-GUIDING CUTTING DEVICE

CROSS REFERENCE TO RELATED APPLICATIONS

This application is a national stage filing under 35 U.S.C. 371 of PCT/US2015/013397, filed Jan. 29, 2015, which claims the benefit of European Application No. 14153724.1, filed Feb. 3, 2014, the disclosures of which are incorporated by reference in their entireties herein.

FIELD

The invention relates to a self-guiding cutting device for cutting adhesive films applied to roof panels of cars.

BACKGROUND

Recently it has become very popular to use different colors on the bodywork of vehicles, for example, having a black color on the roof of a car while the remainder of the bodywork of the car has a different color. The application of different colors requires two subsequent lacquering processes. In the first step a first lacquer layer is applied to the entire bodywork of the vehicle. The first lacquer has to dry before the second lacquer layer can be applied onto the first lacquer layer to provide an area of different color. This operation takes time and increases the production costs. Therefore, there is a need for other methods to apply different colors to the bodywork of a vehicle.

It has been suggested to use appropriately colored polymeric films that can be adhesively attached to the respective portions of the bodywork of a vehicle. Attaching such films onto the roof of the car creates the visual impression of a uniformly continuous area between the car windows. The film may have a high-gloss finish to provide the impression of a continuous glass surface.

When applying adhesive films to the roof of cars the films may be cut into the desired shape after their application to the roof. In such case the lacquer layer of the roof may be damaged by the cutting. When using pre-cut films the precise positioning of the pre-cut films on the car roof is difficult under manufacturing conditions, in particular, in view of typical manufacturing tolerances.

Therefore, it has been an object of the present invention to provide a cutting tool and a corresponding method of cutting an adhesive polymer film being pre-attached to a car roof essentially without damaging the car roof when cutting the film. It has been another object of the present invention to provide a cutting tool that is easy to handle and that can be easily adapted to different car models. It has been still another object of the present invention to provide a cutting tool and a corresponding cutting method that can be reliably used under manufacturing conditions at reasonable costs.

SUMMARY

The above objects are met by the self-guiding cutting tool described herein. The cutting tool is suitable for cutting an adhesive film that has been applied to the roof panel of a car that contains a weld ditch channel. Cars are manufactured by assembling various components. Side panels and roof panels are prepared separately and then joint, typically be welding. The joint area between side panel and roof panel is not even in many car types but contains a small raised area, or in most cases a lowered area, commonly referred to as "weld ditch channel".

Therefore, in one aspect there is provided a self-guiding cutting tool (100) for cutting an adhesive film (20) applied to the roof panel (30) of a car, wherein the roof panel is connected to a side panel (31) of the car by a joint area (32) containing a welding ditch channel, said cutting tool (100) comprising a cutting device (6), at least one guiding means (2) guiding the cutting device (6) over the welding ditch channel of the joint area (32), and at least one transporting means (3) allowing the cutting device (6) to be moved over the welding ditch channel of the joint area (32), wherein the guiding means (2) is mechanical.

In another aspect there is provided a method of applying an adhesive film (20) to the roof panel (30) of a car wherein the roof panel is connected to a side panel (31) of the car by a joint area (32) containing a welding ditch channel, comprising the steps of attaching the adhesive film (20) to the roof panel (30) of the car without adhering the sections of the adhesive film (20) extending from the roof panel over the welding ditch channel towards the side panel;

cutting off the non-adhered sections of the adhesive film by moving the cutting tool (100) according to any one of the preceding claims over the welding ditch channel.

SHORT DESCRIPTION OF THE FIGURES

DETAILED DESCRIPTION

The present invention provides a self-guiding cutting tool for cutting a polymeric film attached to the roof panel of a car.

The bodywork of a car comprises a front panel, a back panel, side panels and a roof panel. During manufacturing of the car the side panels and the roof panels are joined together applying various techniques such as resistance welding, laser stitch welding, laser welding and laser brazing. Depending on the design of the side panels and the roof panel, respectively, and the joining technique used the joint areas can exhibit different shapes and geometries. In one embodiment, the side panel and the roof panel are arranged to form an overlap joint area that contains a ditch shaped welding line. This area is referred to as "roof ditch" or "welding roof ditch". The two panels are joined, for example, by resistance welding resulting in seams running in the ditch joint areas between the respective side panel and the roof panel along both sides of the roof panel. Welding seams obtained by laser welding typically have a smoother surface than welding seams obtained by resistance welding so that laser welding is generally preferred.

When applying films to the roof of a car it is often desired to cut the film along the roof ditch. The self-guiding cutting tool of the present invention allows the films to be cut over the roof ditch or in areas in proximity thereof. The cutting tool contains a cutting device to cut the film. The cutting tool can be moved along the roof ditch by transportation means, for example wheels. The cutting tool may be configured such that the transportation means can be placed on the roof of the car. The position of the cutting device with respect to the roof ditch is controlled by the mechanical guiding means either alone or in combination with the transportation means. The guiding means may movably engage the cutting tool with a portion of the side panel and allow the cutting tool to be moved over the roof in a direction parallel to the side panel. Guiding means, transportation means and cutting device are configured on the cutting tool such that the cutting device is placed in a defined position, namely the position where the film is to be cut. Most conveniently the films can be cut over the roof ditch by the present cutting device.

Figure 1:
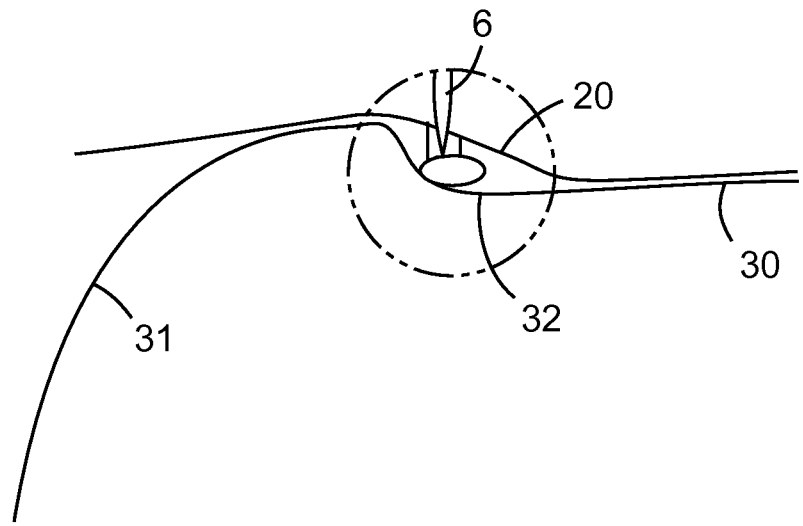
FIG. 1 is a schematic representation of the cutting of an adhesive film on a car roof by the cutting device of the cutting tool according to the present disclosure.

To cut the films, typically, the films are adhered to the roof of the car and the sections of the film over the roof ditch and extending towards the side panel are not adhered to the roof and are lifted upwards. Lifting bars may be used to lift up the films. The cutting tool is then moved with its cutting device over the film along the line to be cut. This is exemplified in FIG. 1 to which is now referred. FIG. 1 is a schematic cross-sectional representation of the joint area (32) between a side panel (31) and a roof panel (30) of a car. The joint area (32) represented in FIG. 1 is lower than its adjacent parts and forms a welding roof ditch. An adhesive polymeric film is placed over the roof panel and it is adhered to the roof panel (30) but is kept in a raised position over the joint area (32). The film is cut by the cutting device (6). The cutting device represented in FIG. 1 is shown together with a protective housing shielding the surface of the joint area (32) from being damaged by the cutting device (6). The cutting proceeds along a defined direction and is guided along that direction by the cutting tool containing guiding means and transportation means.

The configuration of the joint area shown in FIG. 1 is one where the raised area is on the side panel portion (31). However other configurations exist and the cutting tool can also be applied to such other configurations accordingly. For example the raised area may be on the roof panel side. There may also be two raised areas, one on the side panel part (31) and the other on the roof panel part (30). The same cutting method is applied and the film is lifted at the areas where it is to be cut off.

Figure 2:
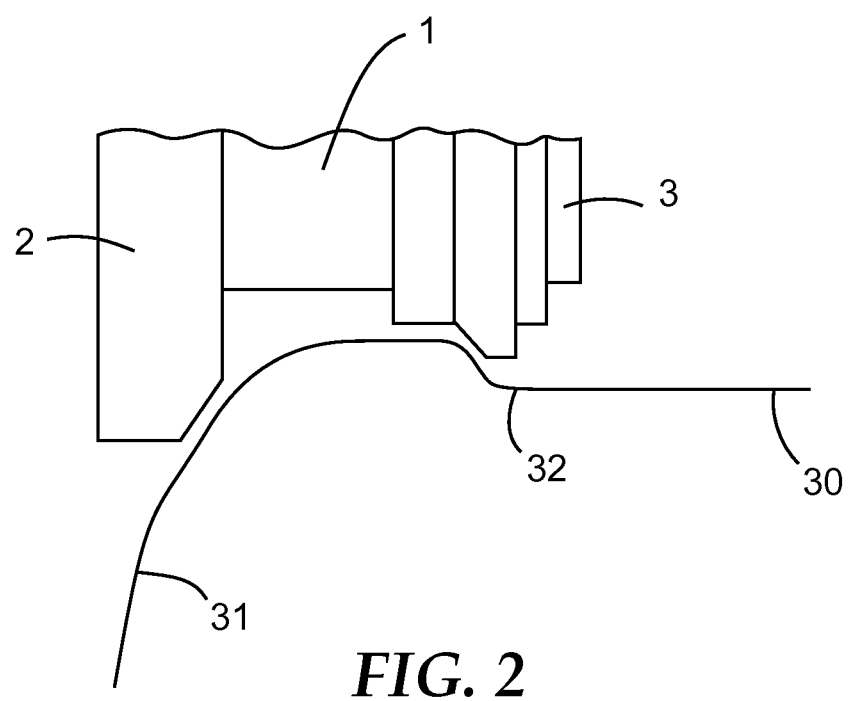
FIG. 2 is schematic cross-sectional view of the cutting tool according to the present disclosure positioned on the joint area between side panel and roof panel of a car.

The cutting tool will now be described in greater detail by referring to the figures. In FIG. 2 a cross-sectional view of the cutting device is shown positioned over the joint area between side panel and roof panel. The joint area shown in FIG. 2 is shaped as a roof ditch (32) extending to the roof panel, with a raised area on the side panel part (31). The opposite configuration of the joint area is also possible, for example a ditch shape where the raised area is not on the side panel part of the joint area but on the roof area. In that case the configuration of the cutting tool may be in reverse order to that shown in FIG. 2. The cutting tool (100) in FIG. 2 contains a body part (1) to which are attached a guiding means (2) and a transportation means (3). In a typical embodiment the guiding means (2) is a wheel, also other embodiments may also be used where the guiding means may be a rubber or plastic lip or a rail. The guiding means (2) is shaped such that it can movably engage the side panel (31) or a portion thereof. The engagement may be a simple contact. In the preferred embodiment where the guiding means (2) is a wheel, the wheel may be angular as shown in FIG. 2, or it may have added thereto a protrusion. In FIG. 2 the guiding wheel (2) has an angular portion adapted to the shape of the side panel. The angular portion of the wheel (2) is such that the inner side of the wheel facing the cutting tool body (1) or the side panel (31) has a smaller diameter than the opposite side, i.e. the side facing away from the side panel. Opposite to the guiding means (2) in FIG. 2 is the transportation means (3). Most conveniently the transportation means is also a wheel. The transportation wheel (3) may be placed on the roof panel. In the particular embodiment shown in FIG. 2, the transportation wheel (3) is of angular shape. It is shaped to engage the raised part of the roof ditch (32). This is achieved by an angular shape of the wheel where one side of the wheel has a smaller diameter than its opposite side, or, for example, by adding a protrusion to the wheel protruding into the ditch. In the embodiment shown in FIG. 2 the inner side of the transportation wheel (3) facing the side panel has a smaller diameter than its opposite side facing the roof panel, which in the embodiment shown in FIG. 2 is achieved by the protrusion on wheel (3). The cutting tool when placed over the roof ditch is now held in place over the ditch by guiding wheel (2) and transportation wheel (3) and can be rolled along the roof ditch in a direction from front to rear of the car or vice versa. The transportation wheel (3) does not have to be of angular shape as shown in FIG. 2. It may be a regular wheel and can simply be placed on a flat surface of the roof panel. The support provided by the guidance wheel (2) may be sufficient to guide the cutting tool over the joint area and control the position of the cutting device. Typically, the guidance wheel (2) which is place on a portion of the side panel has a bigger diameter than the transportation wheel (3) as is also shown in FIG. 2.

The guidance and transportation means for the cutting tools according to the present disclosure are made of a material that is not damaging to lacquered surfaces. Typically, transportation means and guidance means are made of an elastic or flexible material, such as rubber or plastics, like polyamides.

In a preferred embodiment the cutting device contains at least two guidance means (2) and/or at least two transportation means (3), preferably both guiding and transportation means being wheels. Such an embodiment is represented in FIG. 3A.

Figure 3A:
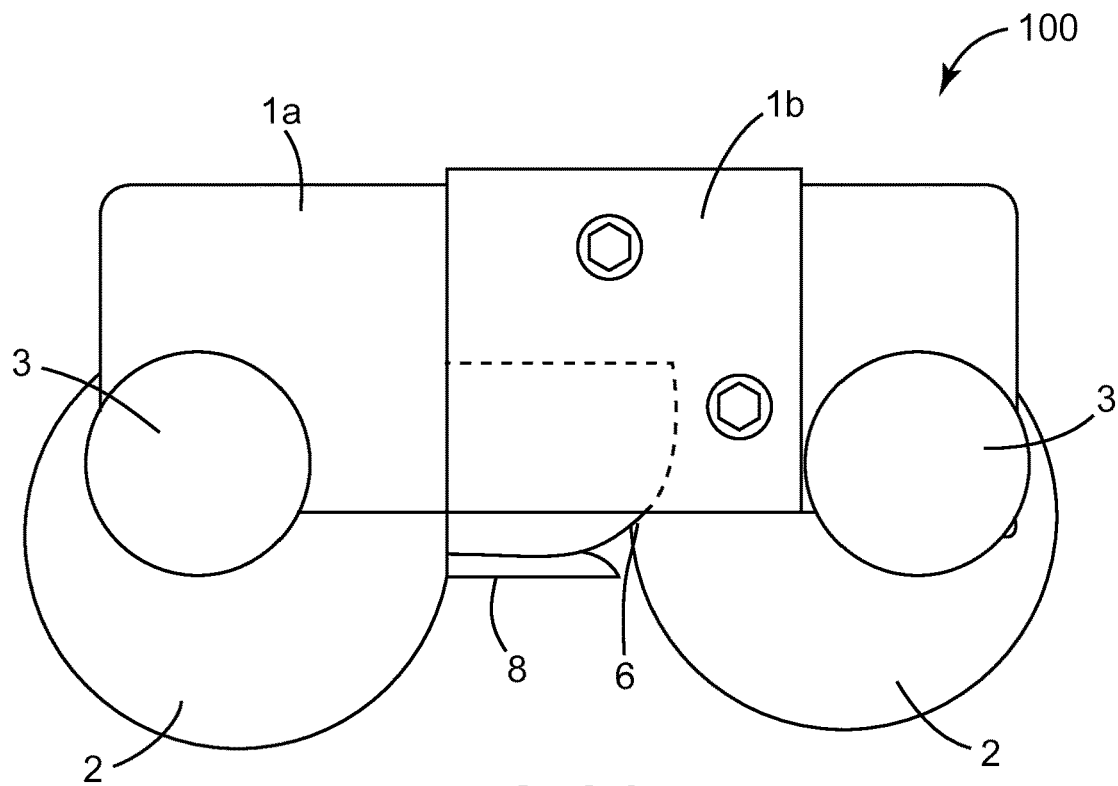
FIG. 3A is a schematic representation of the side view of an embodiment of a self-guiding cutting tool according to the present disclosure.

FIG. 3A shows a schematic side view of a cutting carriage (100). It contains two transportation means (transportation wheels (3)). Opposite the transportation wheels (3) are the guidance wheels (2). According to the present disclosure, the transportation wheels and guidance wheels may be on the same axis or may be on different ones and may also be independently connected to the cutting tool. At least the transportation wheels are rotatably mounted to the body of the cutting tool. Preferably, also the guidance wheels are rotatably mounted to the body of the cutting tool. In the embodiment shown in FIG. 3A the cutting tool contains a body part (1a) to which the wheels are rotatably mounted by two axes.

The cutting tools according to the present disclosure contain at least one cutting device.

In the embodiment represented in FIG. 3A the cutting device (6) is contained in housing (1b) attached to the body part (1a) of the cutting tool. Any cutting device suitable for cutting polymeric films may be used as cutting devices according to the present disclosure. Typical examples include fixed knifes and rotating blades. The cutting device may be mechanically driven or electronically. It may be controlled remotely. The cutting device may be connected to a lifting device, which raised the film to be cut. Cooling devices may be present to cool the cutting device. The cutting device may be positioned where suitable. For example the cutting device may be positioned between guiding means and transportation means or the transportation means may be positioned between cutting device and guiding device. The cutting device may be in a separate housing that can be positioned variably with respect to the body of the cutting tool. This way the cutting tool can be applied to different geometries.

Figure 3B:
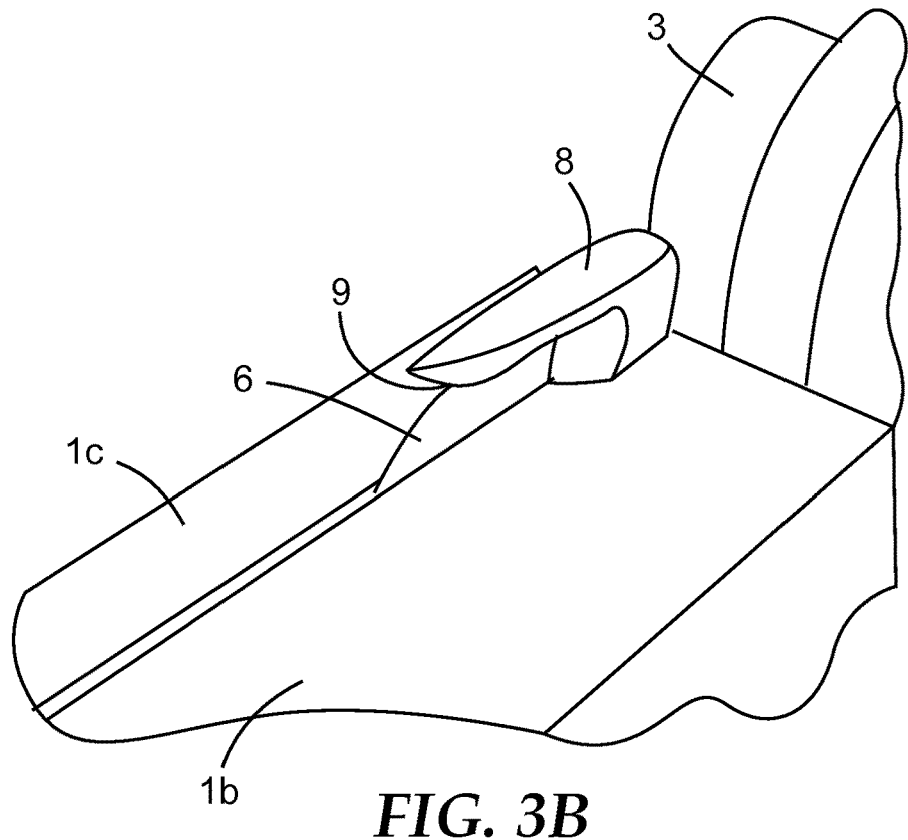
FIG. 3B is a detailed schematic view of a cutting knife and its protective housing of a cutting tool according to the present disclosure.
Figure 3C:
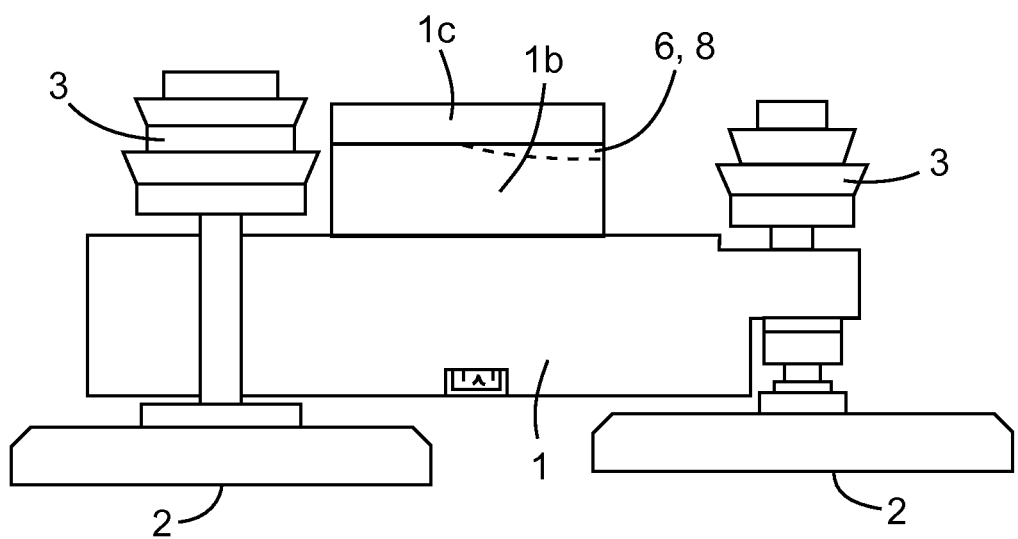
FIG. 3C is a schematic bottom view of a self-guiding cutting tool according to the present disclosure.

The cutting device may be partially surrounded by a protective housing to avoid the cutting device contacting the surface of the car and prevent damage to the car during the cutting operation. In FIG. 3A a protective housing (8) is shown. The protective housing (8) may contain a groove in which the knife or a rotating blade runs during the cutting operation providing additional stability to the knife or rotating blade. The cutting device exemplified in FIG. 3A is a rotating blade which runs in a groove of the protective housing (8) as is shown in FIGS. 3B and 3C.

Transportation means, guidance means and cutting device may be provided adjustably. This way the cutting tool could be applied to different car models and the distance between transportation means and guidance means can be adjusted as needed. Also the cutting device may be connected to the body of the cutting tool such that it can be placed in various positions.

The cutting device may be a carriage for manual use but may also be part of an automated unit and driven electronically. For example, the cutting tool according the present disclosure may be part of an assembly line. Such an assembly line may comprise an assembled car containing a roof panel (30) and a side panel (31) joined to each other to form a joint area (32) containing a welding ditch channel, an unit to apply an adhesive film (20) to the roof panel and a self-guided cutting tool (100) according to the present disclosure.

The cutting tool may be suitable to cut films that are used to provide protective coatings or coloring or other decoration to cars. Such films are typically adhesive films, containing one or more polymer layers and at least one adhesive layer. Typically, the adhesive layer is a pressure-sensitive adhesive. This means the adhesive can be applied to the substrate to provide an adhesive bond without requiring increased temperatures and is simply applied by pressure. Typical adhesives are acrylate-based adhesive, preferably solvent-free adhesives. Typical polymer layers include polyvinylchloride, polyurethanes, polyolefine polymers and combinations thereof. Such films are commercially available, for example under the trade designation SCOTHCAL from 3M Company.

EXAMPLE 1

A roll of Scotchcal® film commercially available from 3M Co was inserted into a guiding bar. Then a piece of the Scotchcal® film having a sufficient length to cover the roof panel of a SKODA FABIA car was dewound from the roll, inserted into an application frame and cut off. The release liner was removed from the Scotchcal® film and the film was placed over the roof panel of the car, lowered onto the roof and adhered to the surface of the roof panel. The portions of the Scotchcal® film adjacent to the edges of the roof panel of the car were not adhered to the roof panel. Then the self-guided cutting tool as shown in FIGS. 3A-3C was placed over the roof ditch with the guidance wheels placed on the side panel of the car and moved in front to rear direction along the side panel over the roof ditch to cut the unadhered Scotchcal® film off.

The invention claimed is:

1. Method of applying an adhesive film to a roof panel of a car wherein the roof panel is connected to a side panel of the car by a joint area containing a welding ditch channel, comprising the steps of
attaching the adhesive film to the roof panel of the car without adhering sections of the adhesive film extending from the roof panel over the welding ditch channel towards the side panel;
cutting off the non-adhered sections of the adhesive film by moving a self-guided cutting tool over the welding ditch channel, said self-guided cutting tool comprising a cutting device, at least one guiding structure guiding the cutting device along the side panel and over the welding ditch channel of the joint area, and at least one transportation structure disposed over the roof panel and allowing the cutting device to be moved over the welding ditch channel of the joint area, wherein the at least one guiding structure is mechanical.

2. The method of claim 1 wherein the at least one transportation structure is a wheel.

3. The method of claim 2, wherein the at least one guiding structure is a wheel configured to engage with a portion of the side panel and allow movement of the cutting tool along the side panel in a direction from a front part to a rear part of the car or in a direction from the rear part to the front part of the car.

4. The method of claim 3, wherein the at least one transportation structure is a wheel that is spaced and configured such that it engages with a raised area of the welding ditch channel.

5. The method of claim 4 further comprising a protective housing surrounding a bottom part of the cutting device to prevent the cutting device from contacting the roof panel when being moved over the welding ditch channel.

6. The method of claim 4 wherein the cutting device is positioned between the at least one guiding structure and the at least one transportation structure.

7. The method of claim 4 wherein the at least one transportation structure is positioned between cutting device and the at least one guiding structure.

8. The method of claim 1, the self-guiding cutting tool comprising at least two transportation structures.

9. The method of claim 1 wherein the guiding structure is a wheel configured to engage with a portion of the side panel and allow movement of the cutting tool along the side panel in a direction from a front part to a rear part of the car or in a direction from the rear part to the front part of the car.

10. The method of claim 1, the self-guiding cutting tool comprising at least two guiding structures.

11. The method of claim 1 wherein the cutting device is positioned between the guiding structure and the at least one transportation structure.

12. The method of claim 1 wherein the at least one transportation structure is positioned between the cutting device and the guiding structure.

13. The method of claim 1 wherein the cutting device contains a cutting blade selected from the group consisting of a fixed blade and a rotating blade.

14. The method of claim 1, the self-guiding cutting tool further comprising a protective housing surrounding a bottom part of the cutting device to prevent the cutting device from contacting the roof panel when being moved over the welding ditch channel.

15. The method of claim 1 wherein the at least one guiding structure is a wheel and wherein the wheel contains an angular portion such that a side facing the cutting tool has a smaller diameter than a side opposite thereto.

16. The method of claim 1 wherein the at least one transportation structure is a wheel that is spaced and configured such that it engages with a raised area of the welding ditch channel.

17. The method of claim 1 wherein the at least one guiding structure and the at least one transportation structure are wheels that are configured and positioned such that the guiding structure engages with a portion of the side panel and the transportation structure engages with a raised area of the welding ditch channel.

18. The method of claim 1 wherein the at least one transportation structure is a wheel containing an angular portion such that a side of the wheel facing the cutting tool has a different diameter than a side opposite thereto.

19. An assembly line comprising an assembled car containing a roof panel and a side panel joined to each other to form a joint area containing a welding ditch channel, an adhesive film applied to the roof panel and a self-guided cutting tool, said self-guided cutting tool comprising a cutting device, at least one guiding structure guiding the cutting device along the side panel and over the welding ditch channel of the joint area, and at least one transportation structure disposed over the roof panel and allowing the cutting device to be moved over the welding ditch channel of the joint area, wherein the at least one guiding structure is mechanical.

* * * * *